(12) United States Patent
Bauer et al.

(10) Patent No.: US 10,457,230 B2
(45) Date of Patent: Oct. 29, 2019

(54) STEERING WHEEL POWER ASSEMBLY

(71) Applicant: SYMTEC, INC., Fridley, MN (US)

(72) Inventors: Joseph C. Bauer, Lindstrom, MN (US); Tom Donnillon, Fridley, MN (US); Riley T. Harlan, Long Lake, MN (US)

(73) Assignee: Symtec, Inc., Fridley, MN (US)

( * ) Notice: Subject to any disclaimer, the term of this patent is extended or adjusted under 35 U.S.C. 154(b) by 0 days.

(21) Appl. No.: 16/132,693

(22) Filed: Sep. 17, 2018

(65) Prior Publication Data

US 2019/0084502 A1    Mar. 21, 2019

Related U.S. Application Data

(60) Provisional application No. 62/559,157, filed on Sep. 15, 2017.

(51) Int. Cl.
*B62D 1/06*     (2006.01)
*B63H 25/02*    (2006.01)
*B60R 16/027*   (2006.01)

(52) U.S. Cl.
CPC .......... *B60R 16/027* (2013.01); *B63H 25/02* (2013.01); *B62D 1/065* (2013.01); *B63H 2025/022* (2013.01)

(58) Field of Classification Search
CPC ...... H01R 39/64; H01R 39/643; H01R 39/08; H01R 39/085; H01R 39/10; H01R 39/12; B60R 16/027; B63H 25/02; B63H 2025/022; B62D 1/065

USPC ...... 439/13–30, 34; 280/775, 731; 180/79.1, 180/142
See application file for complete search history.

(56) References Cited

U.S. PATENT DOCUMENTS

| 4,387,314 | A | * | 6/1983 | Iwaki | H02K 5/141 310/239 |
|---|---|---|---|---|---|
| 4,448,275 | A | * | 5/1984 | Kitagawa | B62D 6/10 180/446 |
| 4,666,010 | A | * | 5/1987 | Morishita | B62D 5/043 180/444 |
| 4,898,258 | A | * | 2/1990 | Ohe | B62D 5/0421 180/444 |
| 5,139,281 | A | * | 8/1992 | Dzioba | B60R 16/027 280/731 |
| 5,213,173 | A | * | 5/1993 | Konishi | B62D 5/0409 180/444 |
| 2009/0189478 | A1 | * | 7/2009 | Wada | H02K 9/28 310/227 |
| 2013/0334934 | A1 | * | 12/2013 | Maeda | H02K 11/33 310/68 B |
| 2015/0143932 | A1 | * | 5/2015 | Igarashi | B62D 37/06 74/5.4 |
| 2017/0290512 | A1 | * | 10/2017 | Antonio | A61B 5/0022 |

* cited by examiner

*Primary Examiner* — Gary F Paumen
(74) *Attorney, Agent, or Firm* — Patterson Thuente Pedersen, P.A.

(57) ABSTRACT

The present invention is directed to systems for providing a pathway for at least one electrical conductor to supply current from a vehicle or marine craft power source to a steering wheel comprising at least one working element for heating or controls. The present invention utilizes a brush and slip ring assemblies inside a hub for infinite rotation of the steering wheel while still maintaining a path for current to travel through the hub to the wheel.

16 Claims, 12 Drawing Sheets

STEERING WHEEL POWER ASSEMBLY

RELATED APPLICATION

The present application claims the benefit of U.S. Provisional Application No. 62/559,157 entitled "STEERING WHEEL POWER ASSEMBLY", filed Sep. 15, 2017, which is incorporated herein by reference in its entirety.

TECHNICAL FIELD

The present disclosure generally relates to device for providing a pathway for at least one electrical conductor to deliver current from a power source to an infinitely rotating steering wheel of a marine vessel or a vehicle.

BACKGROUND

A variety of devices and systems have been developed for providing comfort in heating steering wheels. A primary problem exists in many of these solutions as the heating element on the steering wheel must be supplied with current and the steering wheel has to be able to rotate.

One solution was to create a steering wheel sleeve. For example, in U.S. Pat. No. 4,549,069 an electrically heated cover for a steering wheel is disclosed. The cover is in the shape of an annularly extending cylindrical sleeve parted along a line on said sleeve facing and parallel to the rim of the steering wheel to be mounted on and enclose said rim. The sleeve contains an array of electrically energized heating elements and thermal insulation disposed between the heating elements and the rim when the sleeve is mounted in order to inhibit the flow of heat into the steering wheel and the steering column.

Another method is to provide an electrical pathway through the steering column. For most, the wire connecting a power source to the heating element in the steering wheel must pass through the stationary steering column. This creates an immediate problem because the steering wheel itself must turn relative to the stationary steering column. As a result, it is common to have problems managing the wire as it moves with the continually rotating steering wheel. This is especially problematic in the marine industry where the steering wheel as typically rotates infinitely.

Thus there is a need for steering wheel that allows for infinite rotations of the wheel while supplying current for accessories such as a steering wheel heater or to manage other vehicle controls.

SUMMARY OF THE INVENTION

The present invention is directed to systems for providing a pathway for at least one electrical conductor from a power source to supply current to a steering wheel comprising at least one working element therein or thereon. The working element of the steering wheel may comprise an exemplary heating element to which the electrical conductor(s) connect. Alternatively, the steering wheel may comprise controllers for vehicle functions, e.g., radio, telephone, cruise control, heating and cooling and the like to which the electrical conductor(s) connect.

More specifically, several embodiments of the invention comprise an electrical conductor pathway from a power source and an on/off switch through the steering column to the steering wheel heating elements with accommodation for the continuous winding and unwinding that occurs when the steering wheel is turned relative to the steering column which remains stationary.

The present invention utilizes brush and slip ring assemblies for infinite rotation of the steering wheel while still maintaining a path for current to travel through the hub to the wheel. The device includes a hub with a hollow shaft around which is disposed an attached dual level slip ring. The hub and slip ring nest into a brush holder assembly. The brush holder assembly defines an internal cavity for the slip ring. Opposing brushes are mounted on brush holders and attached to the brush holder assembly. The brush holders are mounted approximately 180 degrees from each other but at different elevations within the brush holder assembly. The fixed brushes are disposed adjacent to the each of the independent slip rings to provide transfer of current as the slip ring rotates.

The brush holder is disposed with an outer cover to which a metal mounting bracket is affixed. The steering column will extend axially through the metal bracket, outer cover, brush holder, slip ring and into the hollow shaft of the hub. On one end of the completed system, adjacent to the hub, a steering wheel will be attached. On the opposing end, the device will be fixed to the vehicle, boat or any other craft which requires a steering wheel. The outer cover includes flanged clamps to hold the hub to the outer cover.

A power line will extend from the vehicle, boat or any other craft which requires a steering wheel to the brush holder, through the channel in the bracket and outer cover. Each brush will be electrically connected to the conductors of the power line. The conductors may be of different lengths to more easily match the position of the brushes within the brush holder. Current will pass from each respective brush to the adjacent slip ring. A post type electrode extends axially from each slip ring through apertures in the hub. Electrical contact with the heater or other steering wheel electrical device is then made to the electrodes The present invention is a steering wheel power assembly for providing current to a steering wheel while allowing for infinite rotation of the steering wheel, the steeling wheel power assembly comprising; a base plate for connection to a steering assembly; a brush holder assembly connected to the base plate, said brush holder assembly including a pair of brush mount assemblies; a slip ring assembly disposed to freely rotate within the brush holder assembly, said brush mount assemblies in electrical contact with the slip ring assembly; a hub connected to the steering wheel and containing a shaft that engages the slip ring; and an outer cover which connects to the hub.

The steering wheel power assembly may include an O-ring is disposed between the outer cover and the hub.

The steering wheel power assembly may include a plurality of clips which are disposed about the perimeter of the outer cover, said clips engaging receptacles within the hub.

The slip ring assembly may include a pair of slip rings disposed axially along a slip ring body. It is envisioned that there is a gap between the two slip rings. The steering wheel power assembly includes a pair of brushes, a spring assembly and a brush holder disk, said brushes disposed at different elevations relative to the brush holder disk, each of said brushes aligned to contact one of the slip rings. The spring assembly advances each brush towards the respective slip ring. The slip ring includes an electrode electrically connected to each slip ring, the electrode extending axially through the hub. The electrode may be a rigid post.

The steering wheel power assembly may include a power line connected to the brush mount assemblies, said brush holder assembly defining an aperture to route the power line into a central channel and a sidewall aperture to direct the power line about an outer perimeter of the brush mount assemblies. A high hex nut connects the steering wheel assembly to the steering wheel.

The present invention is a steering wheel power assembly for providing current to a steering wheel while allowing for infinite clockwise and counterclockwise rotation of the steering wheel, the steeling wheel power assembly comprising; a brush holder assembly, said brush holder assembly including a pair of brush mounts from which a pair of bushes are disposed, the brush holder assembly in a fixed position; a hub with a hollow shaft, said hollow shaft extending into the brush holder assembly; a slip ring assembly attached to the hub, said slip ring assembly disposed to freely rotate within the brush holder assembly, said brushes in electrical contact with the slip ring assembly, said slip ring including a pair of axially extending electrodes that extend through the hub; wherein said hub and slip ring assembly may rotate freely clockwise or counterclockwise more than 360 degrees while still maintaining an electrical connection to the brush holder assembly.

The present invention is also a method of supplying current to a steering wheel across an infinitely rotating joint, the method comprising; connecting a steering wheel to a hub, said hub including a hollow shaft to engage a steering assembly of a vehicle or marine craft; disposing a slip ring about the shaft of the hub, said slip ring including electrodes that extend to the steering wheel; inserting the slip ring and hub into a brush holder assembly, said brush holder assembly including a pair of opposing brushes set to different axial locations so as to engage the slip ring at different axial locations; mounting the brush holder assembly to a base plate, said base plate fixedly attached to the steering assembly; connecting a shaft of the steering assembly to the steering wheel through the brush holder assembly and into the hollow shaft of the hub; connecting an electrical power line from the steering assembly to the brush holder assembly; wherein a current travels from the brush holder assembly to the slip rings and then to the steering wheel.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
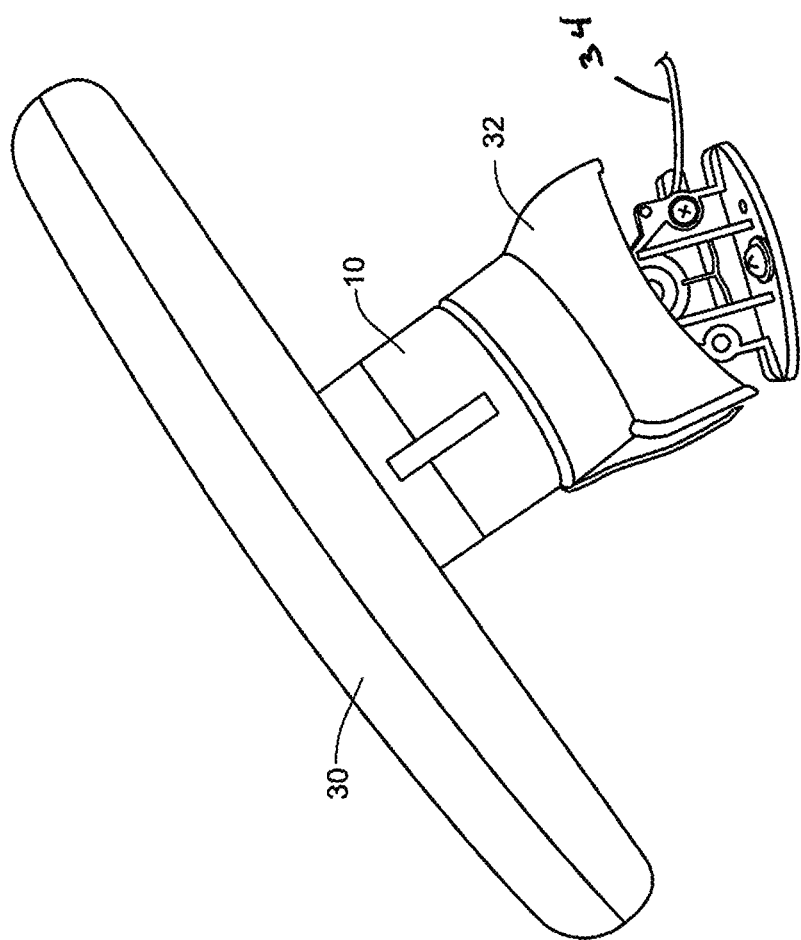
FIG. 1 is a side perspective view of a steering wheel with steering wheel power assembly attached.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present invention is a steering wheel power assembly that provides for power to travel from a vehicle or marine craft, through a steering wheel power assembly to a steering wheel for controls or for steering wheel heating while allowing infinite rotations of the steering wheel.

Figure 2:
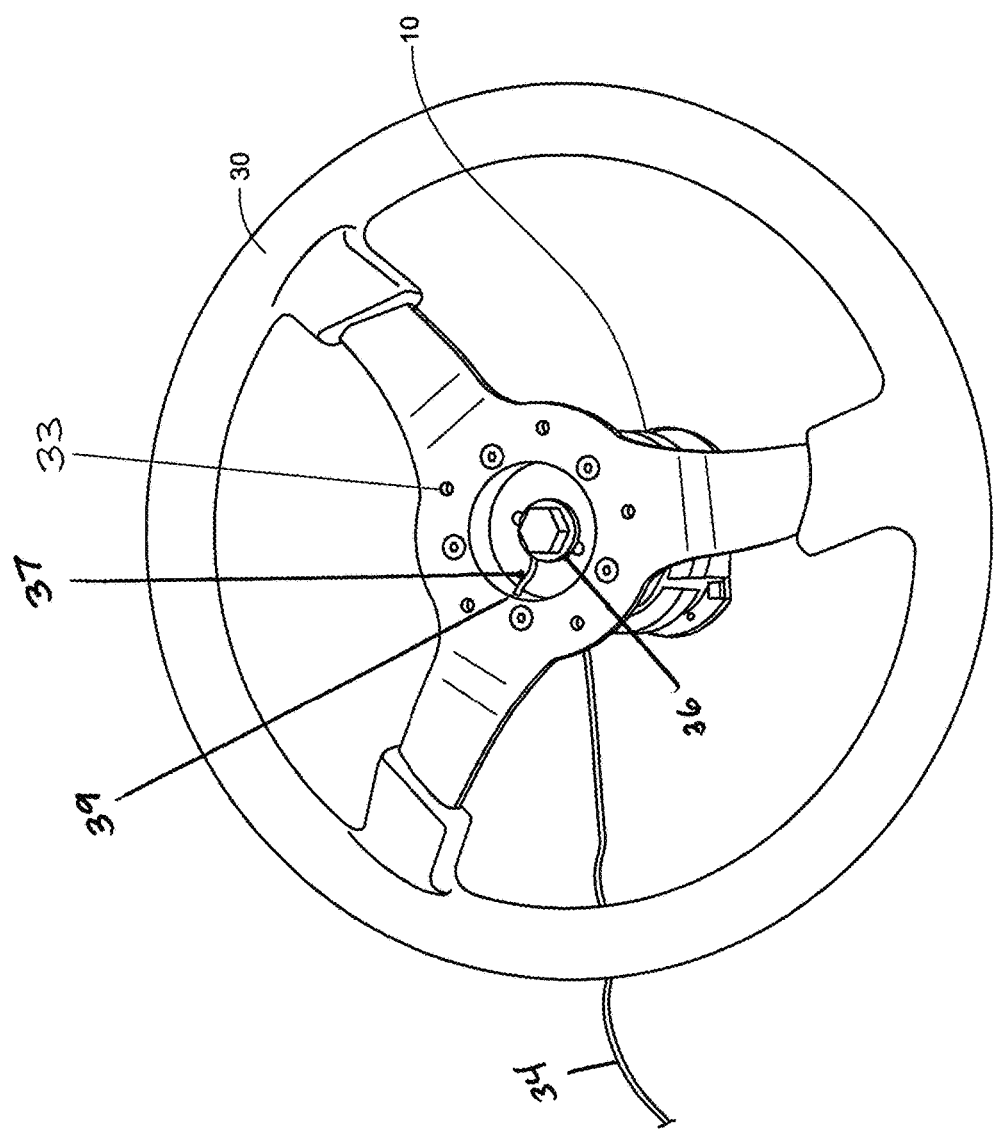
FIG. 2 is a top perspective view of a steering wheel with steering wheel power assembly attached.

FIGS. 1 and 2 are perspective views of a steering wheel 30 with steering wheel power assembly 10 attached to the steering unit 32. The steering wheel power assembly 10 is generally disposed between a steering wheel 30 and a steering unit 32. A power line 34 extends through the steering unit or steering assembly 32 to the steering wheel power assembly 10. While not shown, a steering shaft extends from the steering unit 32, through the steering wheel power assembly 10 to the steering wheel 30. The shaft is connected to the steering wheel 30 by hex nut 36. Steering control power line 37 extends from steering wheel power assembly 10 to the steering wheel through an aperture 39. The steering wheel 30 and steering unit 32 may be found on a marine craft, an automobile or other motorized or non-motorized vehicles.

Figure 3:
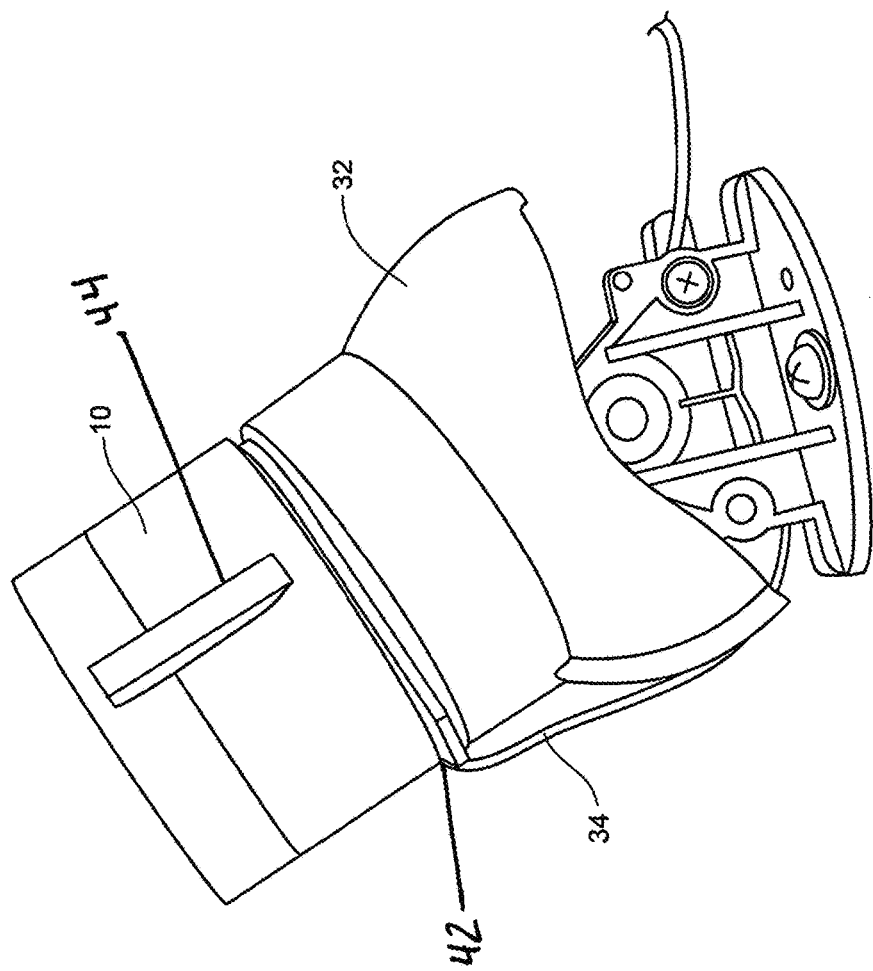
FIG. 3 is a side perspective view of a steering wheel power assembly and steering unit.
Figure 4:
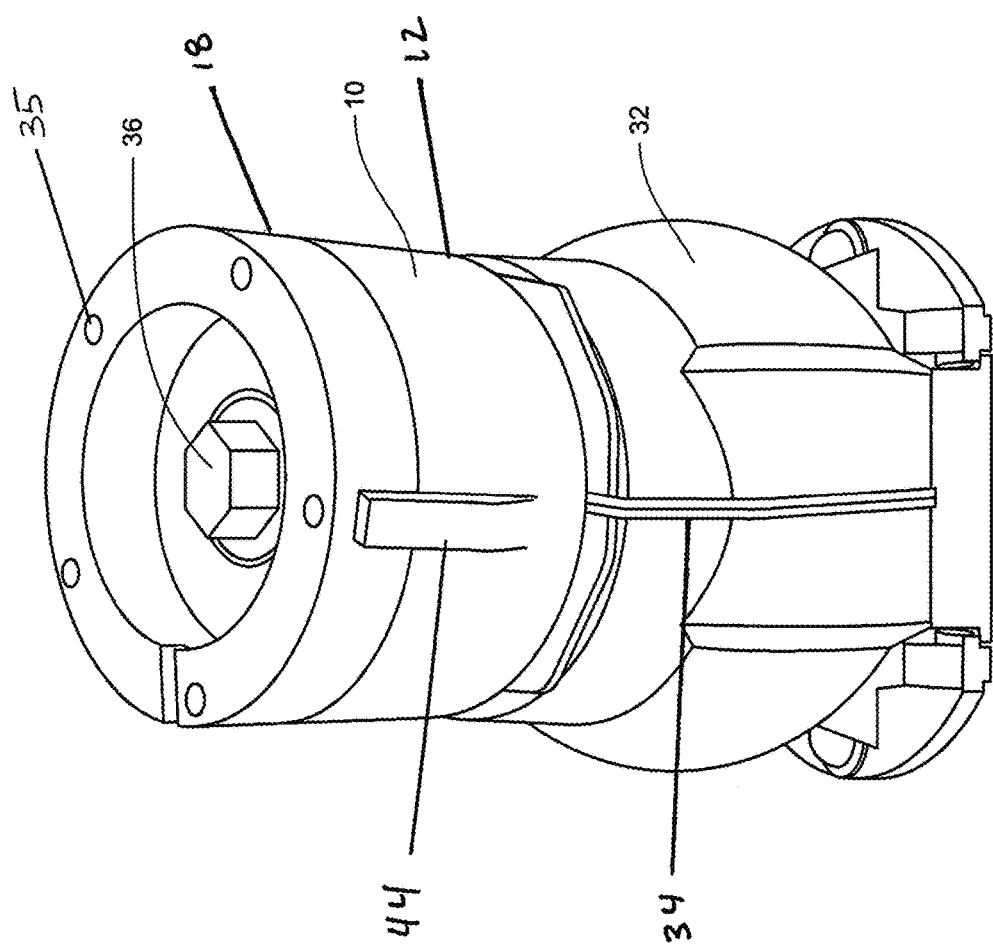
FIG. 4 is a front side perspective view of a steering wheel power assembly and steering unit.

FIG. 3 is a side perspective view of a steering wheel power assembly 10 and steering unit 32 and FIG. 4 is a front side perspective view of a steering wheel power assembly 10 and steering unit 32. Power line 34 is attached to the base of the steering wheel power assembly 10 through aperture 42. Steering wheel 30 is attached to steering wheel power assembly 10 by way of fasteners 33 that extend through the steering wheel 30 into threaded openings 35 in the steering wheel power assembly 10. Hex nut 36 attaches to the steering shaft. Clamping flanges 44 connect the outer cover 12 to the hub 18.

Figure 5:
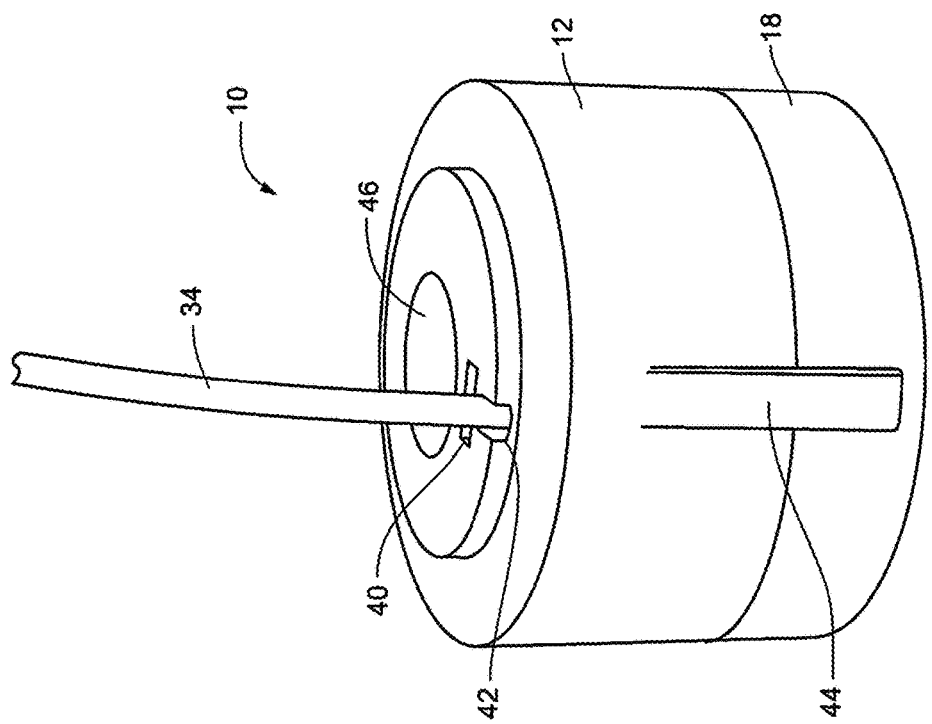
FIG. 5 is a side perspective view of a steering wheel power assembly.

FIG. 5 is a perspective view of a steering wheel power assembly 10. Power line 34 fits into slot 40 so as to provide current to the slip ring 16. A notch 42 allows power line 34 to be bent at a ninety degree angle as the steering wheel power assembly 10 abuts the steering unit 32. A plurality of clamping flanges 44 extend from outer cover 12 to hub 18. Central channel 46 extends through steering wheel power assembly 10 for insertion of the central steering column 36.

Figure 6:
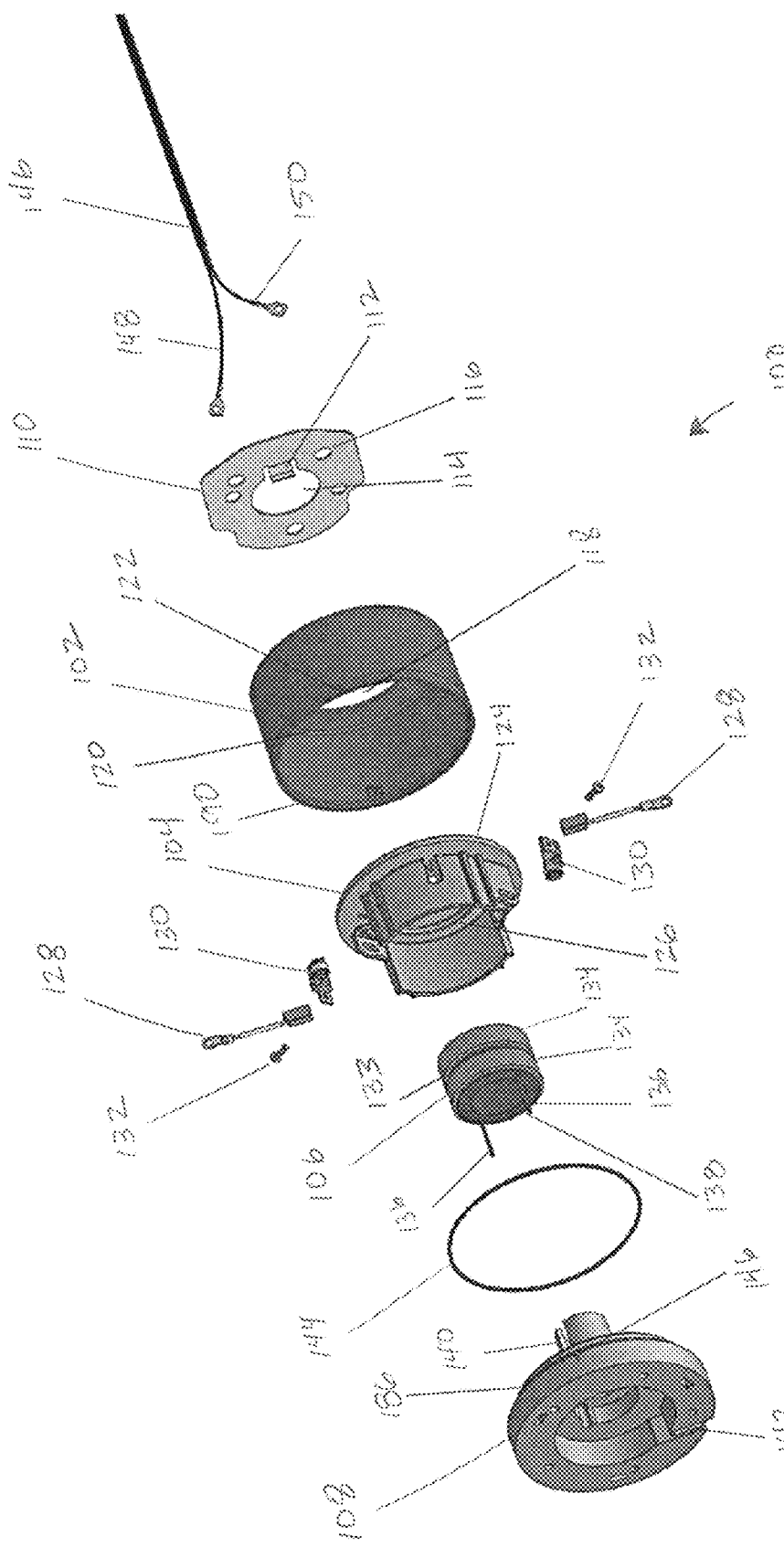
FIG. 6 is an exploded perspective view of the elements of an alternate embodiment of the steering wheel power assembly.
Figure 7:
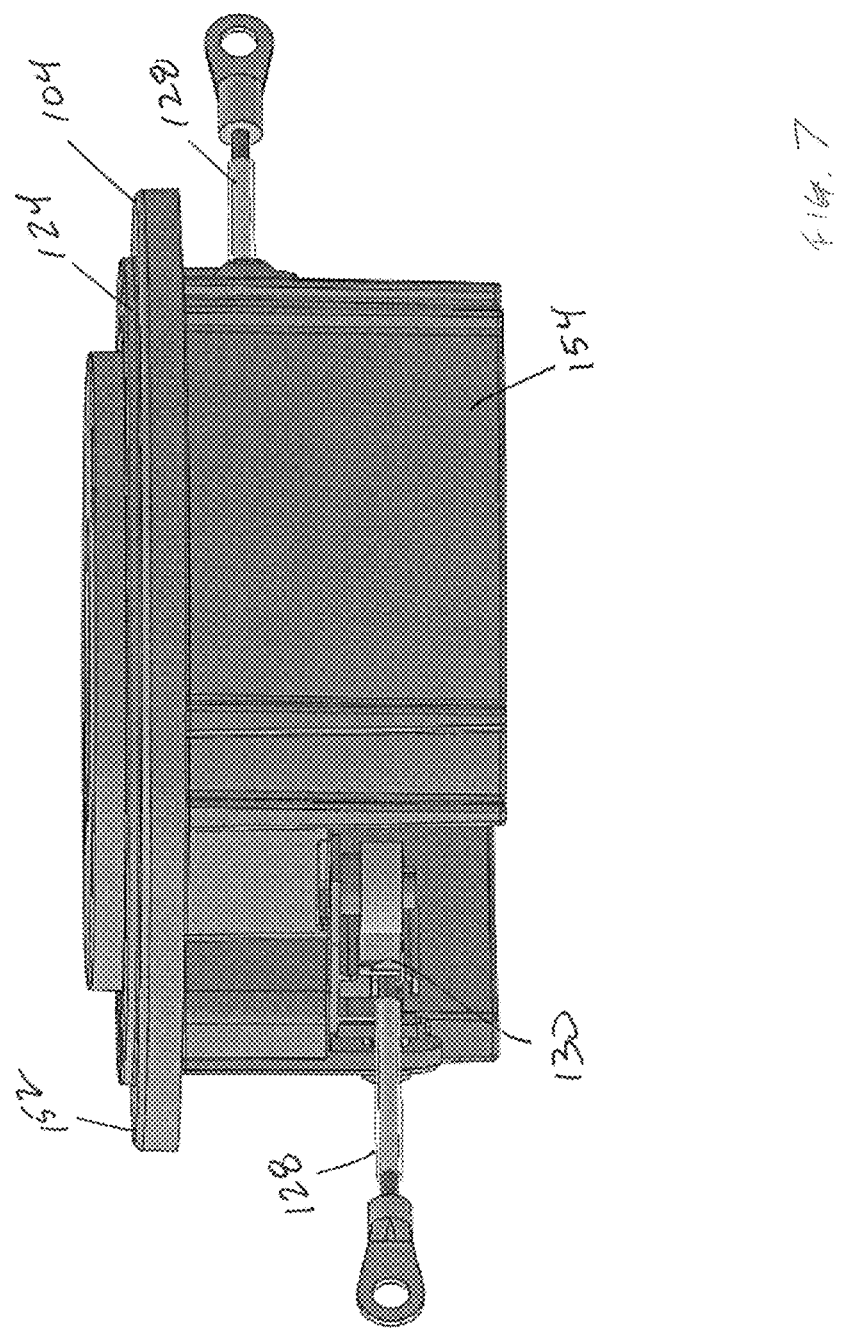
FIG. 7 is a side view of a brush holder assembly of the steering wheel power assembly of FIG. 6.
Figure 8:
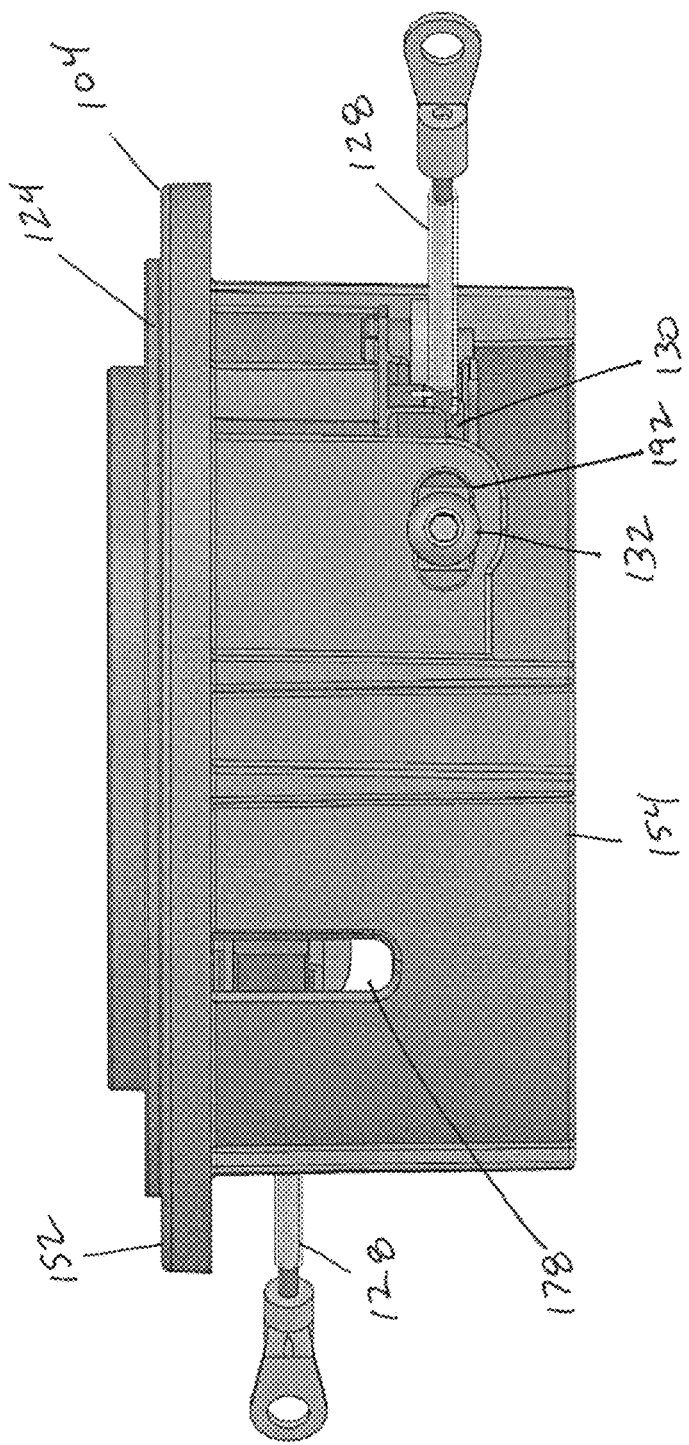
FIG. 8 is a side perspective view of a brush holder assembly of the steering wheel power assembly of FIG. 6.
Figure 9:
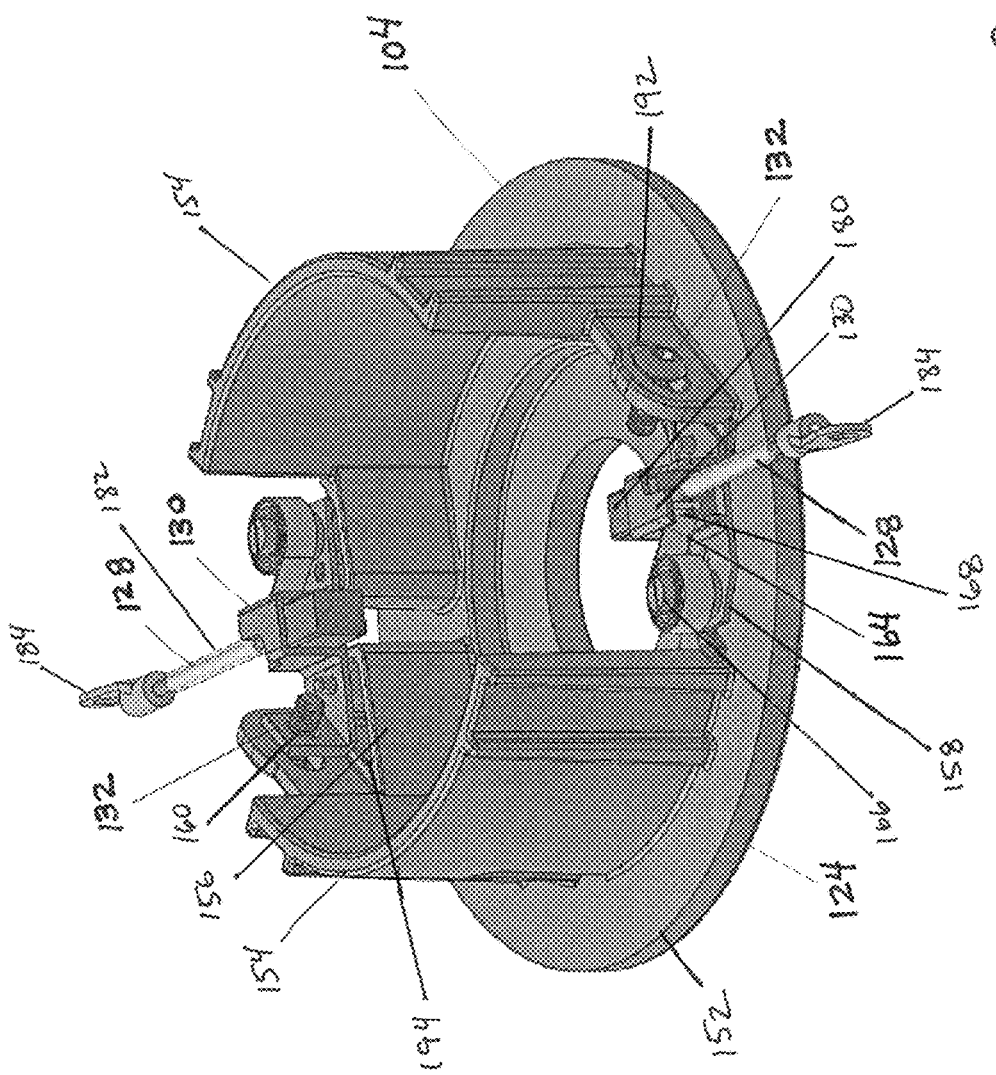
FIG. 9 is an opposing side view of a brush holder assembly of the steering wheel power assembly of FIG. 6.
Figure 10:
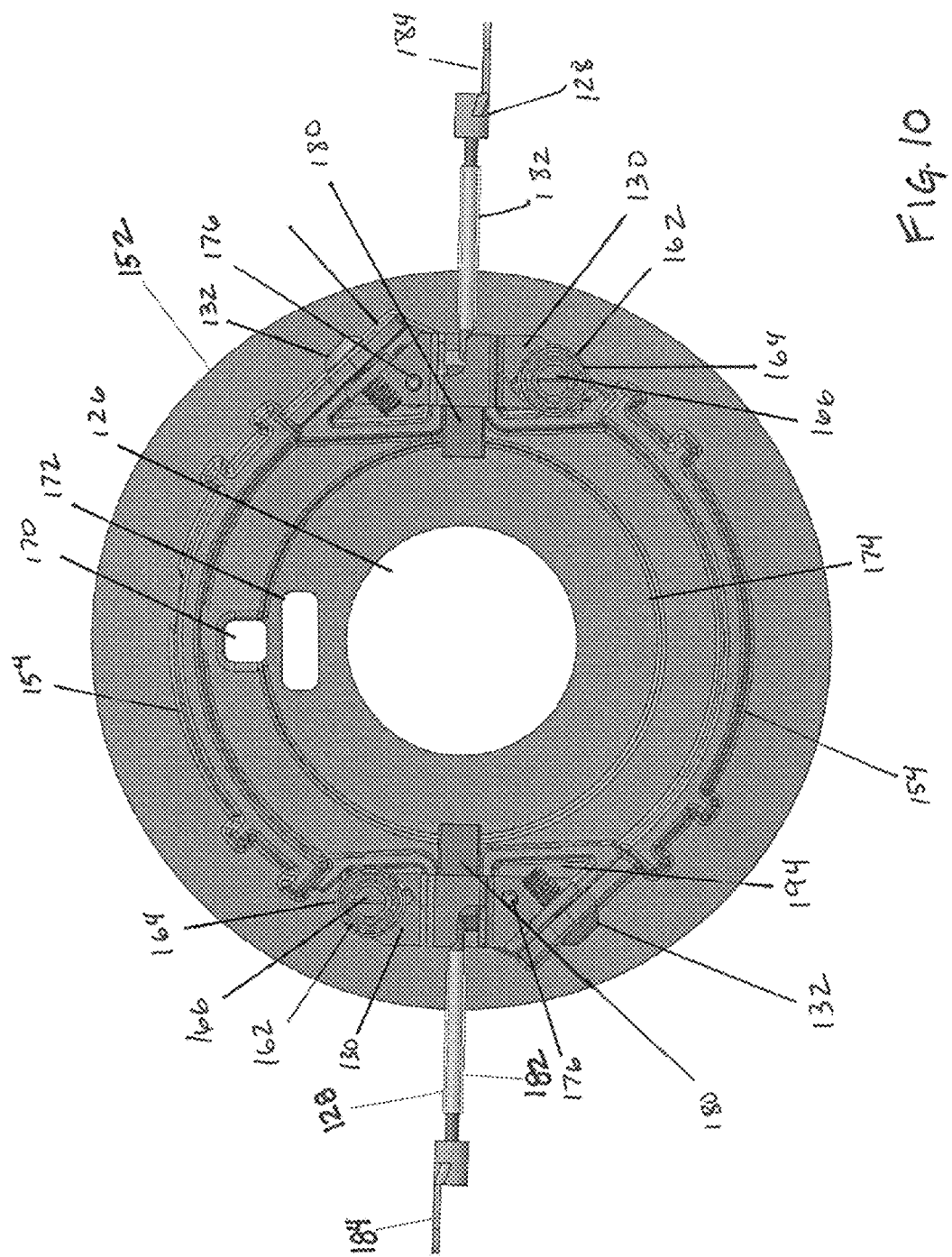
FIG. 10 is a planar view of a brush holder assembly of the steering wheel power assembly of FIG. 6.

FIG. 6 is an exploded perspective view of the elements of an alternate embodiment of steering wheel power assembly 100. The steering wheel power assembly 100 is comprised of an outer cover 102, a brush holder assembly 104, a slip ring assembly 106, a hub 108, and a base plate 110. Brush holder assembly 104 is disposed within outer cover 102 and locked into a stationary relationship with respect base plate 110. Slip ring assembly 106 mates with the hub 108, both of which rotate with steering wheel 30. Outer cover 102 clips into hub 108 to provide a protective structure around slip ring assembly 106 and brush holder assembly 104.

Base plate 110 includes locking flange 112 and defines steering shaft aperture 114. Locking flange 112 extends into brush holder assembly 104 so as fixedly keep brush holder assembly 104 stationary. Base plate 110 further includes mounting apertures 116 for attaching the steering wheel power 100 assembly to the vehicle or marine vessel.

Outer cover 102 is a cylindrical structure defining an outer cover channel 118. Outer cover 102 includes a flanged groove 120 disposed adjacent to the bracket 110. Flanged groove 120 mates with grooved connection 124 in brush holder assembly 104. It is envisioned that groove 120 may contain grease or other lubricant to seal the steering wheel power 100 assembly from debris. A series of connecting flanges 122 are disposed axially about the outer face of cover 102. Flange 122 may include a clip end for engagement hub 108.

Brush holder assembly 104 defines a central channel 126, a plurality of brushes 128. The brushes 128 are mounted to the brush holder assembly 104 by brush mount 130 that is fastened by screw 132. The central channel 126 is sized for the insertion of the slip rings 106. The brush mounts 130 are disposed axially offset so that only one brush 128 is in contact with one slip ring 106.

Slip ring 106 is comprised of a slip ring body 133 that has a pair of slip rings 134 axially arranged. A pair of electrodes 136 extend axially from slip ring 106. Electrodes 136 are operably and electrically connected to each slip ring 134, respectively. Slip ring body 133 defines an aperture 138 that is sized to accept shaft 140 of hub 108.

Hub 108 includes shaft 140 that mates with aperture 138 of slip ring 106. Hub 108 includes a lead wire slot channel 142 that allows for connection of electrodes 136 with the heater or controls on a steering wheel. Hub 108 further includes slots or flanges 146 for mounting with the flanges 122 of outer cover 102

An O ring 144 is disposed between hub 108 and outer cover 102 to seal the assembly 100. Hub 108 includes a circular lip 186 and outer cover 102 includes an internal circular lip 190 for maintaining O ring 144 between the two elements.

A power line 146 is split into conductor 148 and 150. Each conductor 148 and 150 is operably connected to the brushes 128 by routing the power line through. It is known to one of ordinary skill that one of the conductors is the positive and one conductor is the negative.

FIGS. 7-10 depict the assembled brush holder assembly 104. Brush holder assembly 104 includes a brush holder disk 152 from which a pair of arcuate walls 154 extend axially towards the hub 108. The brush holder assembly 104 is a generally cylindrical body resting on a disk structure. Between the arcuate walls 154, are disposed brush support structure 156 and 158. Brush support structure 156 extends axially farther than brush support structure 158 due to the differing heights needed to engage the slip rings 134.

Brush mount 130 is disposed on brush support structures 156 and 158. The brush mount 130 includes a flange connection 160 through which screw 132 engages brush support structure 156 and 158. Screw 132 is inserted through flange connection 160 into slot 192 of the respective brush mount support structures. Brush mount 130 also includes spring assembly 162 for advancing the brush 128 towards the slip ring 134. Spring assembly 162 includes a spring 164 attached to spring mount 166 and brush engagement end 168. A location pin 176 extends axially from brush support structure 156 and 158 to engage brush mount 130. The locking pin 176 fixes the brush mount 130 in the axial direction while flange 160 and screw 132 provide support radially. Brush mount support structure 156 further defines a cavity 194 on which brush mount 130 is positioned.

The disk 152 further includes a central channel 126, power line aperture 170 and base plate flange aperture 172. Power line 146 extends through power line aperture 170 in the disk and then is routed through arcuate wall slot 178. The slot 178 is angled radially to hold the power line 146 in position for connection with brushes 128. The brushes 128 each contain a brush end 180, a conductor 182 and a connector 184. The connectors 184 electrically connect with conductors 148 and 150 of power line 146. Disk 152 further includes a recessed area 174 sized to accommodate slip ring 106. On the opposing side of disk 152 from the recessed area 174 is a grooved connector 124 for mating with outer cover 102.

The brushes 180 are mounted 180-degrees opposite from each other but at different elevations with respect to the disk 152. The brushes 180 are in one embodiment constructed of a bronze graphite or could be constructed of similar materials. The conductors 182 may be covered along their length with a protective coating. The brushes 180 are advanced to the slip rings 132 by the spring assembly 162.

Figure 11:
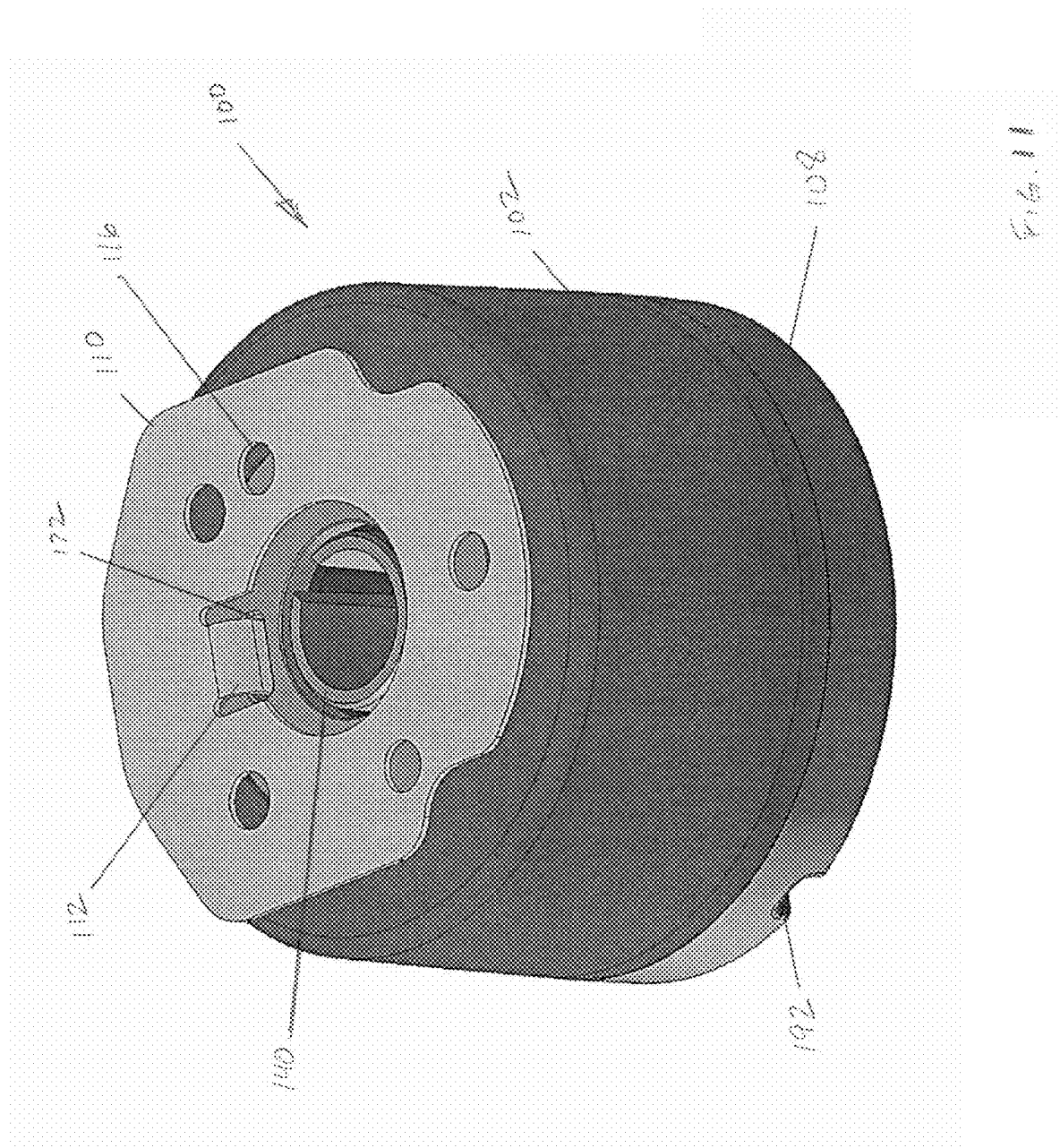
FIG. 11 is a bottom perspective view of a steering wheel power assembly of FIG. 6.

FIG. 11 illustrates a perspective view of the steering wheel power assembly 100. The steering wheel power assembly 100 is comprised of an outer cover 102, a brush holder assembly 104, a hub 108, and a base plate 110. The flange 112 of base plate 110 is placed through the base plate flange aperture 172. Aperture 192 allows for the power conductor [not shown] from slip ring 106 to connect with the heater or other controls on the steering wheel.

Figure 12:
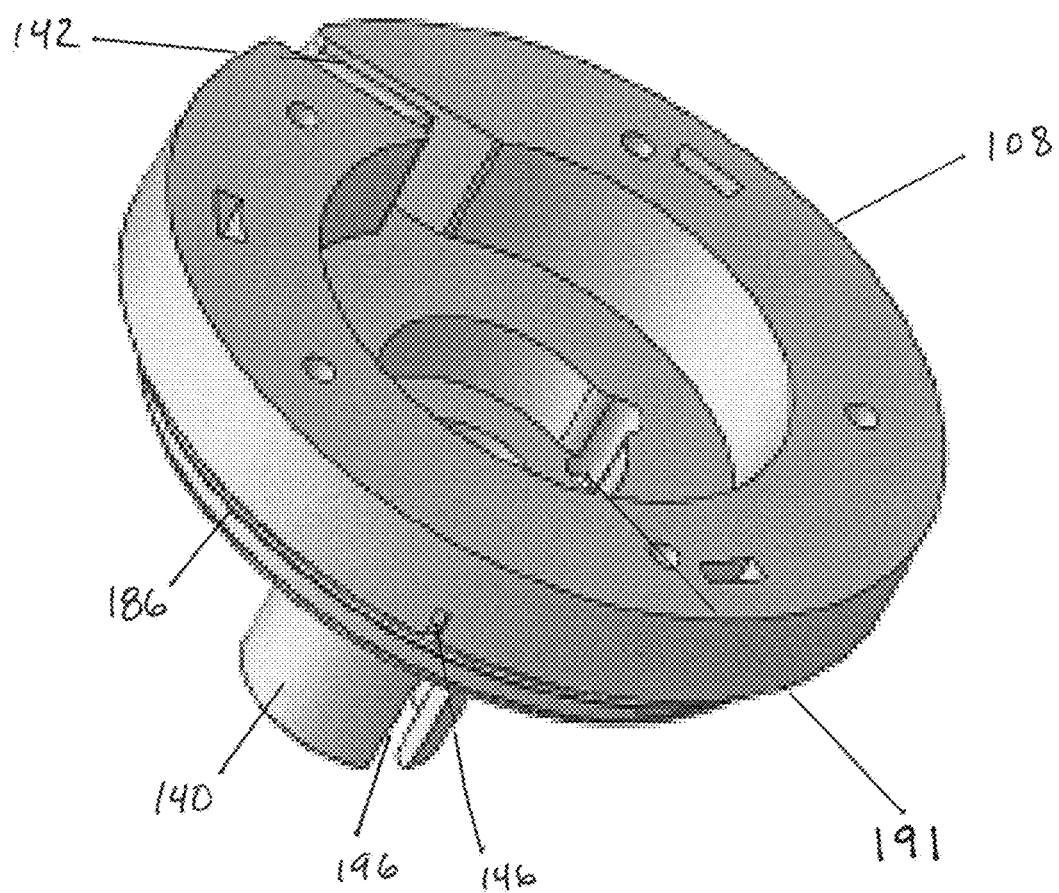
FIG. 12 is a perspective view of the hub of the steering wheel power assembly of FIG. 6.

FIG. 12 is a perspective view of the hub 108. Electrode apertures 191 are disposed on both sides of hollow shaft 140. Electrodes 136 from slip ring assembly 106 extend through the apertures 191 without interfering with fastening the hex nut to the shaft. The shaft from the vehicle or marine vessels steering assembly will extend through the hollow shaft 140 and be fastened into place by hex nut 36. The hollow shaft 140 may include a slot, key or spline type aperture 196 for mating with the shaft.

In operation, electrical current is provided by power line 146 and then routed to the brush holder assembly. Electrodes 184 connected to the brushes 180 are electrically connected to the power line 146. The connection is made in one embodiment, about the outer perimeter of the arcuate perimeter walls 154. Current flows through the brushes 180 and makes contact with the slip rings 134. Electrodes 136 attached to the slip rings 134 extend axially toward the steering wheel 30. Steering wheel heaters, or various control systems can then be powered. The steering wheel 30 can be spun infinitely as there is no fixed electrical connection between the steering assembly 32 and the steering wheel 30.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

The invention claimed is:

1. A steering wheel power assembly for providing current to a steering wheel while allowing for infinite rotation of the steering wheel, the steeling wheel power assembly comprising;
    a base plate for connection to a steering assembly, the steering assembly fixed to a vehicle or a marine craft;
    a brush holder assembly connected to the base plate, said brush holder assembly including a pair of brush mounts and a brush holder disk;
    a slip ring assembly disposed to freely rotate within the brush holder assembly, said brush mounts in electrical contact with the slip ring assembly;
    a hub connected to the steering wheel and containing a hollow shaft that engages the slip ring; and
    an outer cover which connects to the hub.

2. The steering wheel power assembly of claim 1 wherein an O-ring is disposed between the outer cover and the hub.

3. The steering wheel power assembly of claim 1 wherein a plurality of clips are disposed about a perimeter of the outer cover, said clips engaging receptacles within the hub.

4. The steering wheel power assembly of claim 1 wherein the slip ring assembly includes a pair of slip rings disposed axially along a slip ring body.

5. The steering wheel power assembly of claim 4 wherein there is an axial gap between the two slip rings.

6. The steering wheel power assembly of claim 4 wherein the brush mount includes a pair of brushes and a spring assembly, said brushes disposed at different elevations relative to the brush holder disk, each of said brushes aligned to contact one of the slip rings.

7. The steering wheel power assembly of claim 6 wherein the spring assembly includes a spring that is connected to the brush and advances each brush towards the respective slip ring.

8. The steering wheel power assembly of claim 4 wherein the slip ring assembly includes an electrode electrically connected to each slip ring, the electrode extending from each respective slip ring axially through the hub.

9. The steering wheel power assembly of claim 8 wherein the electrode is a rigid post.

10. The steering wheel power assembly of claim 4 wherein the brush mount is connected to the brush holder assembly by a positioning pin and fastener disposed transverse to the pin.

11. The steering wheel power assembly of claim 1 wherein a power line is connected to the brush mount assemblies, said brush holder assembly defining an aperture to route the power line into a central channel and a sidewall aperture to direct the power line about an outer perimeter of the brush mount assemblies.

12. The steering wheel power assembly of claim 1 wherein a high hex nut connects the steering wheel assembly to the steering wheel.

13. The steering wheel power assembly of claim 1 further including a seal between a mating groove on the outer cover that mates and a groove on the brush holder assembly, said seal filled with a lubricant to keep out debris.

14. A steering wheel power assembly for providing current to a steering wheel while allowing for infinite rotation of the steering wheel, the steeling wheel power assembly comprising;
    a brush holder assembly, said brush holder assembly including a pair of brush mounts from which a pair of bushes are disposed, the brush holder assembly in a fixed position;
    a hub with a hollow shaft, said hollow shaft extending into the brush holder assembly;
    a slip ring assembly attached to the hub, said slip ring assembly disposed to freely rotate within the brush holder assembly, said brushes in electrical contact with the slip ring assembly, said slip ring assembly including a pair of slip rings and a pair of axially extending electrode posts that extend axially through the hub, each post electrode matched with a slip ring;
    wherein said hub and slip ring assembly may rotate freely clockwise or counterclockwise more than 360 degrees while still maintaining an electrical connection to the brush holder assembly.

15. The steering wheel power assembly of claim 14 wherein the brushes are disposed at different elevations relative to the hub so that each brush is in contact with one of the pair of slip rings.

16. A method of supplying current to a steering wheel across an infinitely rotating joint, the method comprising;
    connecting a steering wheel to a hub, said hub including a hollow shaft to engage a steering assembly of a vehicle or marine craft;
    disposing a slip ring about the shaft of the hub, said slip ring including electrodes that extend to the steering wheel;
    inserting the slip ring and hub into a brush holder assembly, said brush holder assembly including a pair of opposing brushes set to different axial locations so as to engage the slip ring at different axial locations;
    mounting the brush holder assembly to a base plate, said base plate fixedly attached to the steering assembly;
    connecting a shaft of the steering assembly to the steering wheel through the brush holder assembly and into the hollow shaft of the hub;
    connecting an electrical power line from the steering assembly to the brush holder assembly;
    wherein a current travels from the brush holder assembly to the slip rings and then to the steering wheel.

* * * * *

UNITED STATES PATENT AND TRADEMARK OFFICE
CERTIFICATE OF CORRECTION

PATENT NO. : 10,457,230 B2
APPLICATION NO. : 16/132693
DATED : October 29, 2019
INVENTOR(S) : Bauer et al.

Page 1 of 1

It is certified that error appears in the above-identified patent and that said Letters Patent is hereby corrected as shown below:

In the Claims

<u>Column 8, Line 23 Claim 14:</u>
Delete "bushes" and insert --brushes--.

Signed and Sealed this
Eighteenth Day of February, 2020

Andrei Iancu
*Director of the United States Patent and Trademark Office*